United States Patent [19]

Puschner

[11] 4,396,820
[45] Aug. 2, 1983

[54] METHOD OF MAKING A FILLED ELECTRODE FOR ARC WELDING

[76] Inventor: Manfred Puschner, Zeisigweg 8, 5650 Solingen 1, Fed. Rep. of Germany

[21] Appl. No.: 285,133

[22] Filed: Jul. 20, 1981

[30] Foreign Application Priority Data

Jul. 21, 1980 [DE] Fed. Rep. of Germany ....... 3027547
Jun. 19, 1981 [DE] Fed. Rep. of Germany ....... 3124287

[51] Int. Cl.³ .............................................. B23K 15/00
[52] U.S. Cl. ........................ 219/121 ED; 219/121 EC
[58] Field of Search ................ 219/121 EC, 121 ED, 219/146.1, 146.23, 146.27, 123, 64

[56] References Cited

U.S. PATENT DOCUMENTS

| | | | |
|---|---|---|---|
| 2,949,142 | 7/1960 | Sjoman | 219/146.22 X |
| 3,033,977 | 5/1962 | Quaas | 219/146.23 X |
| 3,275,786 | 9/1966 | Cushman | 219/123 X |
| 3,585,351 | 6/1971 | Hinrichs | 219/121 ED X |
| 3,701,881 | 10/1972 | Rother et al. | 219/123 |
| 3,764,303 | 10/1973 | Schmidt | 219/146.23 X |
| 3,834,002 | 9/1974 | Sissens et al. | 219/146.22 |
| 3,848,109 | 11/1974 | Zvanut | 219/146.23 X |
| 4,122,238 | 10/1978 | Frantzerb, Sr. | 219/146.1 X |
| 4,336,441 | 6/1982 | Godai et al. | 219/123 X |

FOREIGN PATENT DOCUMENTS

| | | |
|---|---|---|
| 2603412 | 4/1978 | Fed. Rep. of Germany . |
| 2719357 | 11/1978 | Fed. Rep. of Germany . |
| 51-25440 | 3/1976 | Japan ........................... 219/121 ED |
| 836296 | 6/1960 | United Kingdom . |
| 1485571 | 9/1977 | United Kingdom . |

*Primary Examiner*—C. L. Albritton
*Attorney, Agent, or Firm*—Karl F. Ross; Herbert Dubno

[57] ABSTRACT

A welding electrode of the filling type for machine or hand welding is formed by providing a longitudinally extending stepped ridge along one edge of a strip which is then bent transversely so that the opposite edge lies in the step and is a projecting portion of the step, underlies the gap, the resulting tubular member receiving the filling. The junction is then welded by tungsten inert gas or electron beam welding to close the shell and seal the latter.

11 Claims, 8 Drawing Figures

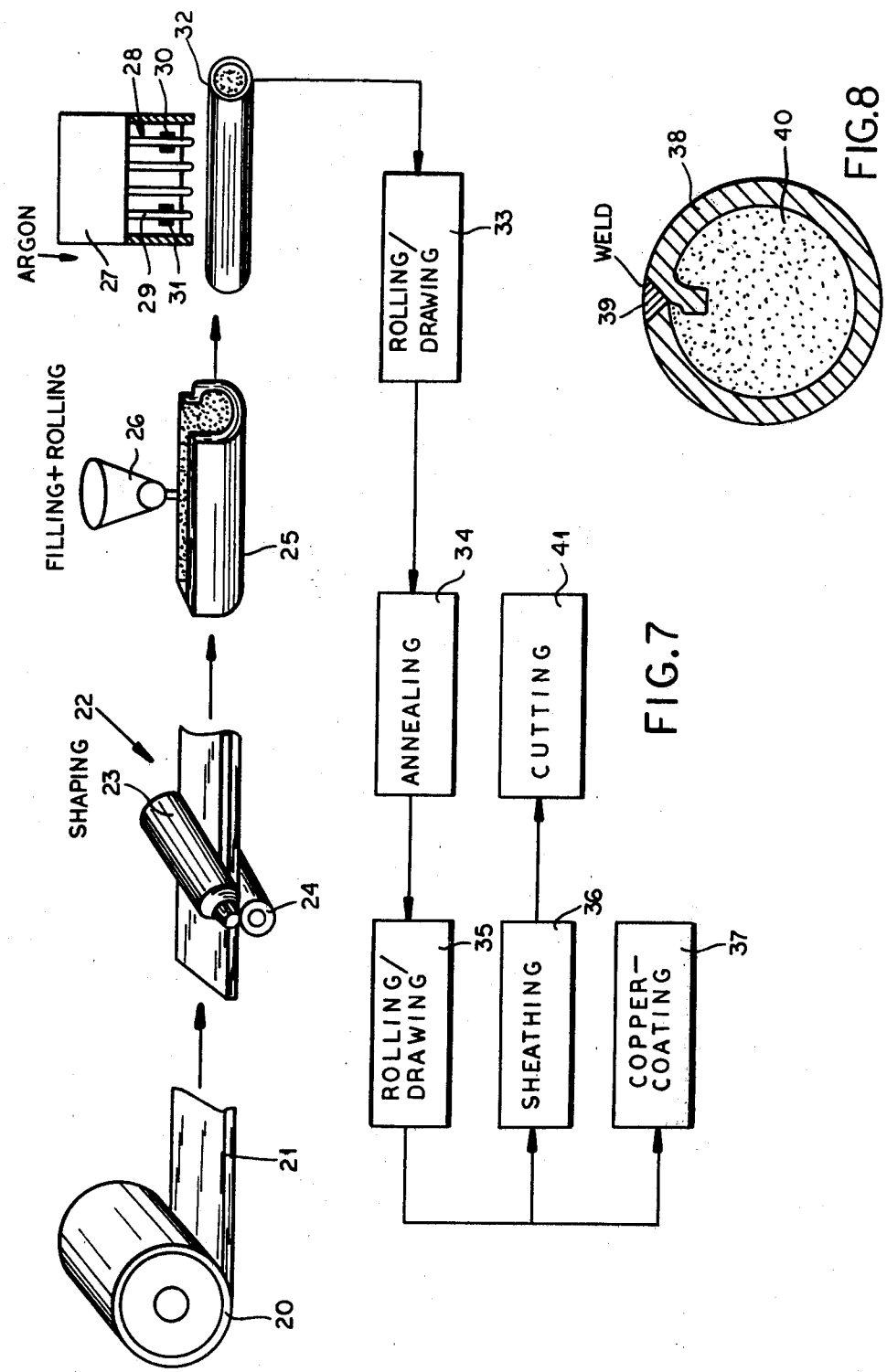

METHOD OF MAKING A FILLED ELECTRODE FOR ARC WELDING

FIELD OF THE INVENTION

My present invention relates to a method of making a filled electrode for arc welding purposes and, more particularly, to a method of making filled electrode wires or rods for machine or manual welding.

BACKGROUND OF THE INVENTION

In arc welding, filled wire or rod or filled wire or rod electrodes, as these terms are defined in German Industrial Standard DIN 8571 (March 1966 edition) comprise tubular metal members containing a filling of an arc stabilizing, protective-gas-producing, slag forming, alloying and/or fluxing material generally in pulverulent or other packed form.

Such electrodes can be used to strike an arc with a workpiece for deposit welding or can be used as a filling metal by being fed into an arc struck between a nonconsumable electrode and the workpiece.

Basically, two groups or filled wire or filled wire electrodes can be mentioned. In a first of these groups the tubular structure is not completely closed, i.e. the structure is made from strip material and the ends are bent, folded, overlapped or otherwise brought together to provide a seam which is not completely sealed.

A second group of electrodes has a sealed seam and hence the enclosed filling is protected from the environment completely.

This second group of electrodes has the advantage that it can be subjected to a wet process for coating it with copper, the copper serving as a lubricant when the electrode wire is fed through a welding machine guide and as a conductivity-promoting layer reducing the contact resistance between the welding current source and the electrode. The wet process does not involve penetration of moisture to the filling of this type of electrode and such electrodes can be used with particular advantage for hydrogen-controlled welding since the filling does not pick up moisture.

The nonsealed electrodes, however, either cannot be subjected to wet copper coating because of moisture penetration to the filling, the moisture being difficult if not impossible to remove, or can be subjected to such coating only if the wetting of the filling is immaterial, thereby limiting the welding operations for which such electrodes can be used.

For example, when the continuously formed electrodes are cut into lengths for use as manual welding electrodes, and are to be sheathed with flux agents or, more generally, compositions which can be termed welding assists, the coating method must avoid moisture penetration to the filling.

The present invention is primarily concerned with sealed electrodes and mention can be made of the methods of fabrication disclosed in the German patent documents Nos. 1,602,260, 25 15 342 and 27 19 357.

The systems described in German patent documents Nos. 1,602,260 and 27 19 357 operate intermittently and thus are disadvantageous because they cannot be used for the continuous production of the welding wire. A continuous method is used in German patent document No. 25 15 342.

It should also be noted that nonsealed electrodes cannot be readily rolled, drawn or otherwise reduced in diameter to diameters less than 1.6 mm. Smaller diameter electrodes are of principal interest commercially.

In the use of filled electrodes and filled wires for the deposition of weldment upon a workpiece, consideration must be given to the nature of the transfer of material from the wire to the pool of welding. The electromagnetic fields should be rotationally symmetrical and should permit such transfer in the form of uniform drops.

A disadvantage of conventional sealed electrodes is that the sealing process, generally by welding, appears to result in a breakthrough of material inwardly beyond the gap or some other distortion of the electrode.

OBJECT OF THE INVENTION

It is the principal object of the present invention to provide an improved method of making a filled welding electrode or welding wire whereby disadvantages of prior art methods can be avoided and, particularly, whereby the wire can be produced continuously and in a sealed manner, but affords uniform transfer of material to the pool of weldment.

SUMMARY OF THE INVENTION

This object and others which will become apparent hereinafter are attained, in accordance with the present invention, by a continuous method for producing filled wire for arc welding which comprises forming a continuous strip of the metal adapted to constitute the tubular body of the wire with a longitudinally extending stepped formation along one edge of the strip, bending the strip into a channel configuration, introducing the filling into the channel, then bringing the edges of the channel together whereby a laterally projecting portion of the step underlies the other edge of the bent strip, and welding the resulting junction closed so that this projecting portion prevents breakthrough of the molten material of the tubular body.

Surprisingly, an electrode formed in this manner has extremely uniform electrical and magnetic fields thereat thereof which are rotationally symmetrical and thus delivers the molten metal in the plasma arc to the workpiece in the form of uniform droplets.

The channel-shaped bending and the closing of the channel can be achieved by passing the strip between suitably shaped rollers. Furthermore, the filling can be deposited in the channel by a vibratory dispenser in flowable pulverulent form so that it need not be previously agglomerated.

The welding can be effected by multicathode tungsten inert gas welding (TIG) or by electron beam welding.

The lateral projection of the step also serves to prevent any detrimental effect of the welding heat upon the filling, it having been found that such effects can transfer with the uniformity of the droplet-forming process.

When the multicathode TIG welding is carried out in accordance with the invention, up to four individually suitable tungsten cathodes can be used in an argon atmosphere via a water-cooled burner, these cathodes being spaced along the weld seam.

The pool of weldment is thus elongated along the seam and the process can be carried out extremely rapidly, e.g. at speeds of 15 m/min.

Electron beam welding can be carried out utilizing a so-called atmospheric device, i.e. a device which does not require a high vacuum or even a partial vacuum at the weld location. It is desirable, however, to carry out the welding in a protective-gas bell so that the filling site is under an argon atmosphere and excludes ambient air from the filling region. Under these conditions welding rates equivalent to those obtained with the TIG process can be achieved.

The filled tubular body can then be subjected to conventional rolling, drawing and annealing processes to bring the wire to the desired diameter.

The process of the invention has been found to be far more rapid and hence economical than the methods described in German patent documents Nos. 1,602,260 and 27 19 357, and to produce electrodes of greater uniformity over long periods of time. By comparison with the system of German patent document No. 25 15 342, only one strip is required for the system of the present invention and the droplet characteristics are improved.

When multicathode TIG welding is employed, the number of tungsten cathodes can be reduced by providing individual arcs, for example, the first and last, with magnetic stabilization, e.g. with small electromagnets on the burner which concentrate the arcs or, as required, deflect them so that they drag or lead, to provide high welding efficiency. It is also possible to provide a single magnetically stabilized TIG burner for the purposes described. This is particularly the case when strip thicknesses less than 0.5 mm are employed for the fabrication of electrodes and filled wire with diameters below 1.6 mm.

In some cases it has been found to be desirable to provide the nonstepped edge with an inwardly directed rib fitting into the step, thereby further reducing the thermal effect of the welding process on the filling.

The filling can be any conventional filling for arc welding electrodes or wires, for example, a titanic acid or basic filling and it has been found to be advantageous to add metallic components, such as iron powder which can increase the rate at which metal is deposited. Powders of metals which are to be alloyed with the welded material can also be added. The filled wires of the invention can be coated or sheathed, can be cut to length for manual welding or coiled for machine use, or applied to any arc welding process.

BRIEF DESCRIPTION OF THE DRAWING

The above and other objects, features and advantages of the present invention will become more readily apparent from the following description, reference being made to the accompanying drawing in which:

FIG. 7 is a flow diagram showing successive steps in the process in highly schematic form; and FIG. 8 is a section through an electrode in accordance with the invention.

SPECIFIC DESCRIPTION

Figure 1:
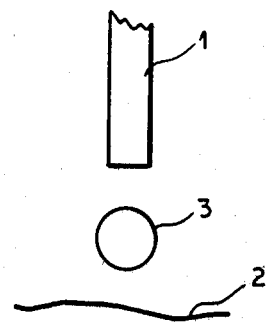
FIGS. 1 and 2 are diagrams illustrating the previous discussion of the quality of transfer of metal from a welding electrode to the pool of weldment.
Figure 2:
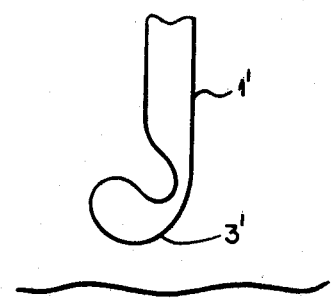

When a filled wire electrode 1 (FIG. 1) generates symmetric electrical and magnetic fields in the arc or plasma gap with the pool 2 of weldment, the droplets 3 of the molten metal delivered to the pool are compact and more or less symmetrical as has been diagrammatically represented in FIG. 1. With the earlier continuous methods of making welding wire, the sealing of the longitudinal seam of the electrode resulted in distortion of the properties thereof so that the droplets form at 3' at the end of the electrode 1' also highly distorted and indeed tend to break up and spatter. This effect, shown in FIG. 2, is avoided by the method of invention.

Figure 3:
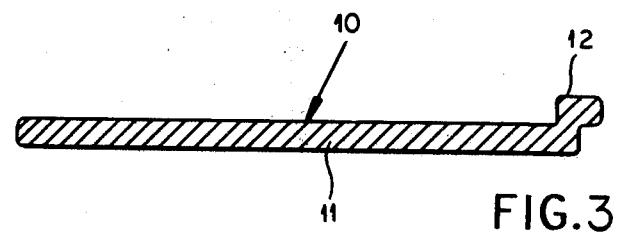
FIG. 3 is a cross section drawn to a scale greater than actual size, through a strip to be formed into a welding electrode according to the invention.
Figure 4:
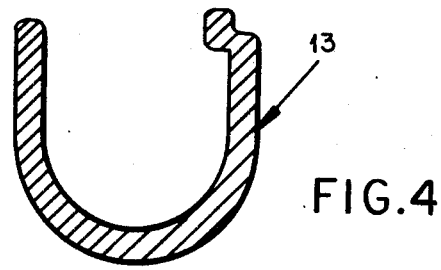
FIGS. 4 and 5 are sectional views illustrating successive steps in the process.
Figure 5:
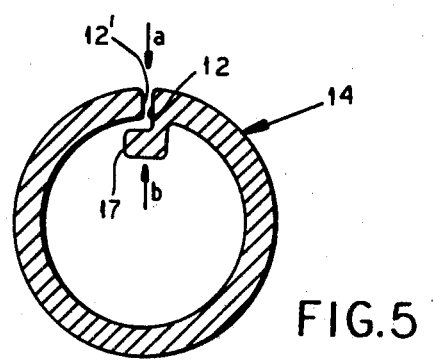

As can be seen from FIG. 3, the strip 10 is rolled to provide a stepped formation 12 along one edge of the strip, the remainder of which can remain flat as shown at 11. The strip is then passed between rollers and formed into the channel configuration 13 of FIG. 4, the filling being deposited in this channel and the channel being thereafter closed as shown in FIG. 5, the opposite edge 12' being fitted into the step 12 so that a portion 17 of the step underlies the gap. The seam is welded closed at a and member 17 forms a barrier as represented at b against thermal degradation to the filling and breakthrough of the weld material.

This can be seen in FIG. 8 which shows the body after the weld 39 has been formed. The tubular body 38 thus increases the filling 40.

Figure 6:
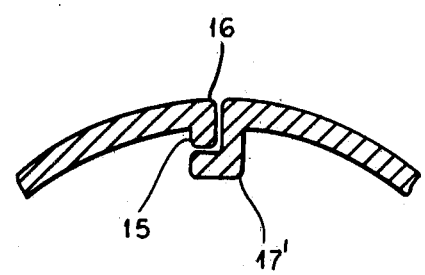
FIG. 6 is a fragmentary section illustrating a modification of the embodiment shown in FIG. 5.

Alternatively, the edge 16 opposite the step (FIG. 6) can be formed with an inwardly formed rib 15 which fits against the projection 17'.

FIG. 7 diagrammatically represents the method and from this Figure it can be seen that the flat strip 21 can be drawn from a coil 20 and fed between rolles 23 and 24 at a shaping station 22 to provide the strip along one longitudinal edge, the strip being thereafter bent into the channel shape shown at 25 for filling from the vibratory dispenser 26. The channel is then rolled closed and a weld seam 32 is formed longitudinally thereon via a TIG burner represented diagrammatically at 27 and having argon-shielded electrodes 28, the first and last of which, represented at 29, can be provided with magnetic stabilization coils 30 and 31. The tubular body can then be rolled or drawn to an intermediate diameter at 33, annealed at 34, rolled or drawn to the final diameter at 35 and copper coated at 37. Alternatively, the wire can be externally sheathed in a welding assist at 36 and cut into lengths at 41.

The wire electrode can be sheathed, can include a hard-metal or other alloying or surface-modification agent, preferably in granular form for deposition in the weldment or for facing a workpiece.

The electrodes can be sheathed with lubricating as well as protective-gas forming coatings and thereby reduce die wear upon reduction in cross section even with hard or sharp-edged fillers.

I claim:

1. A method of making a filled wire for arc welding comprising the steps of:
  (a) continuously forming a metal strip with a stepped formation along one longitudinal edge thereof;
  (b) bending the strip having said stepped formation along said one edge into a U-shaped channel;
  (c) introducing a filling into said channel;
  (d) thereafter with said strip in direct contact with said filling, directly bending the longitudinal edges of said strip into close juxtaposition whereby the other longitudinal edge of said strip lies in the stepped formation of said one edge and a projection of said formation underlies said other edge within the tubular body thus formed;

(e) fusion welding said edges together to seal said filling within said body;

(f) reducing the diameter of said body to the diameter of the desired welding wire; and (g) annealing said welding wire.

2. The method defined in claim 1 wherein said edges are welded together by a multicathode TIG welding effected along said body.

3. The method defined in claim 1 wherein said edges are welded together by electron beam welding under an argon atmosphere.

4. The method defined in claim 2 or claim 3 wherein said filling is a pulverulent material vibrated into said channel and includes a metallic component capable of deposition with weldment during welding with said wire.

5. The method defined in claim 4 wherein said filling contains iron powder.

6. The method defined in claim 4 wherein said filling contains an alloy.

7. The method defined in claim 2, further comprising the step of magnetically stabilizing a TIG welding arc during the welding of said seam.

8. The method defined in claim 7 wherein the TIG welding is carried out with a multicathode TIG welding burner.

9. The method defined in claim 7 wherein the welding is carried out with a single magnetically stabilized TIG burner.

10. The method defined in claim 2 or claim 3 wherein said other edge is formed with a rib received in said stepped formation.

11. A welding wire made by the method defined in claim 2 or claim 3.

* * * * *